May 29, 1962 J. H. BARNES 3,036,866
WHEEL COVER POSITIONED STYLE SIDEWALL
Filed Oct. 31, 1960

INVENTOR.
JAMES H. BARNES
BY Oldham & Oldham
ATTYS.

United States Patent Office 3,036,866
Patented May 29, 1962

3,036,866
WHEEL COVER POSITIONED STYLE SIDEWALL
James H. Barnes, 154 1st St., Wadsworth, Ohio
Filed Oct. 31, 1960, Ser. No. 66,086
5 Claims. (Cl. 301—37)

The present invention relates to decorative sidewalls for pneumatic tire and wheel assemblies, and especially to a detachable sidewall trim member or ring especially adapted for convenient engagement with a pneumatic tire and wheel assembly, and to combinations of the trim member with the tire and wheel assembly.

Heretofore there have been various attempts made to provide removable, decorative sidewall trim members or rings for use with pneumatic tire and wheel assemblies. One very well received type of a tire trim member is shown in my own prior Patent No. 2,737,422. This sidewall trim member is held in engagement with a pneumatic tire and wheel assembly by means of an integral skirt or radially inner section on the trim member that is compressed between a pneumatic tire bead and the inner surface of a wheel flange. The remainder of the trim member would extend radially outwardly of the tire and wheel assembly and would overlay the sidewall portion of the tire for decorative purposes. However, the assembly of such trim members into a tire and wheel unit requires the deflation of the tire and a careful positioning of the radially inner skirt part of the trim member on the tire wheel followed by careful reinflation of the tire in order to grip the skirt portion of the trim member properly between the wheel flange and the tire bead. Thus it has been a somewhat tedious, costly process to position these trim members of the prior types in tire and wheel assemblies.

The general object of the present invention is to provide a novel and improved type of a trim member for use with tire and wheel assemblies, characterized by the fact that the trim member is adapted to be secured to the tire and wheel assembly by means of a metal wheel cover securing a radially inner portion of the trim member to a wheel rim flange, and with the remainder of the trim member extending radially outwardly of the tire and wheel assembly from the wheel cover for the decorative action desired.

Another object of the invention is to provide a decorative, removable trim member for use with pneumatic tire and wheel assemblies and where the trim member can be conveniently and easily positioned in secure engagement with the tire and wheel assembly without deflation of the tire.

A further object of the invention is to provide a resilient or flexible trim member for association with a tire and wheel assembly and wherein the trim member has an axially inwardly extending radially inner portion adapted for effective compression attachment to the rim portion of a tire and wheel assembly by means of the wheel cover removably engaged with such wheel.

Another object of the invention is to provide a resilient tire trim member of the type described wherein a thin axially inwardly directed radially inner portion, or web is provided on the trim member, and an enlarged bead is provided on the end of the web to aid in obtaining an effective clamping engagement of the trim member with a tire and wheel assembly by use of the resilient fingers on wheel covers of conventional construction, which fingers removably engage a wheel rim for securing the wheel cover thereto.

Another object of the invention is to provide conventional wheel covers and wheels with a trim member that can be easily and rapidly secured to the wheel assembly by the conventional wheel cover to position a radially outer portion of the trim member extending radially outwardly of the assembly and lying closely against the edge of the wheel flange and associated portions of a tire sidewall.

Another object of the invention is to use an enlarged bead or rib at the radially and axially inner end of a trim member and positioned axially inwardly beyond the gripping flange or fingers on a wheel cover that engages a web of the trim member to secure it to a wheel.

The foregoing and other objects and advantages of the invention will be made more apparent as the specification proceeds.

Reference now should be particularly directed to the accompanying drawings, where:

When referring to corresponding parts shown in the drawings and referred to in the specification, corresponding numerals are used to facilitate comparison therebetween.

Figure 1:
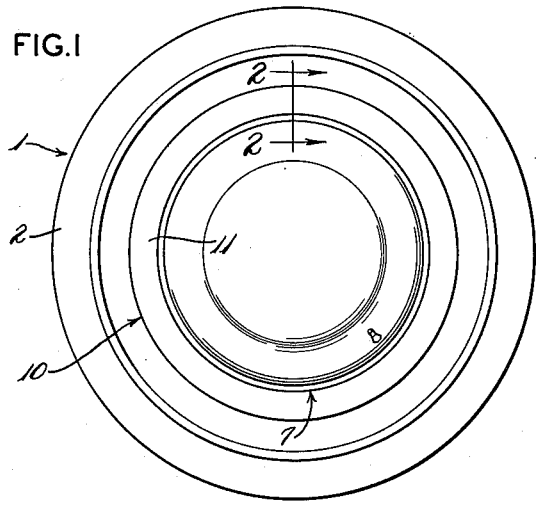
FIG. 1 is an elevation of a tire and wheel assembly having a trim member embodying the principles of the invention removably secured thereto.

The present invention, in general, relates to a resilient trim member for association with the sidewalls of pneumatic tires and adapted to be secured to a tire and wheel assembly by a removable wheel cover or the like, and where the trim member comprises a relatively flatly curved, radially outer section, and a radially inner or skirt section connecting to the radially outer section and including a web portion extending axially inwardly of the trim member as operatively associated with a tire and wheel assembly and where the axially inner end of the skirt section is enlarged and the web portion is adapted to be squeezed or compressed radially outwardly of the wheel against a portion of the wheel rim by a wheel cover by resilient finger or locking means, or the like provided on the wheel cover as operatively sprung or forced into contact with the wheel rim for operative assembly of the wheel cover. The invention also covers the combination formed by assembly of the trim member with the tire and wheel unit.

Particular attention now is directed to the details of the structure shown in the accompanying drawings, and a tire and wheel assembly is indicated as a whole by the numeral 1. Such tire and wheel assembly, includes any conventional type of a tire 2 that is positioned on any conventional style of a wheel 3. The wheel 3 usually is of the type shown in U.S. Patents Nos. 2,819,119 or 2,862,769, for example, and includes a tire engaging rim 4 that has a conventional laterally and radially outwardly extending rim flange 5 formed thereon. This rim flange 5 normally has the bead of the tire 2 tightly seated thereagainst. The rim 4 provides, on its radially inner surface, a hollow conically shaped wall 6 at the base of the rim flange 5 that normally tapers radially inwardly at an angle of a few degrees to the wheel axis from the axially outer margin of the rim 4.

Conventional wheel covers 7 of any desired construction are provided for engaging with the radially inner wall 6 of the rim 4 to be removably secured thereto, as by means of a plurality of circumferentially spaced generally axially inwardly extending resilient fingers 8 that are turned radially outwardly and axially backwardly upon the remainder of the fingers 8 to form substantially U-shaped radially inner ends 9 on the fingers 8. Such fingers 8 at the U-shaped ends 9 thereof usually bite into, or otherwise solidly frictionally engage the associated metal surface of the wall 6 of the rim to retain the wheel cover effectively in engagement with the wheel and tire assembly 1.

Figure 3:
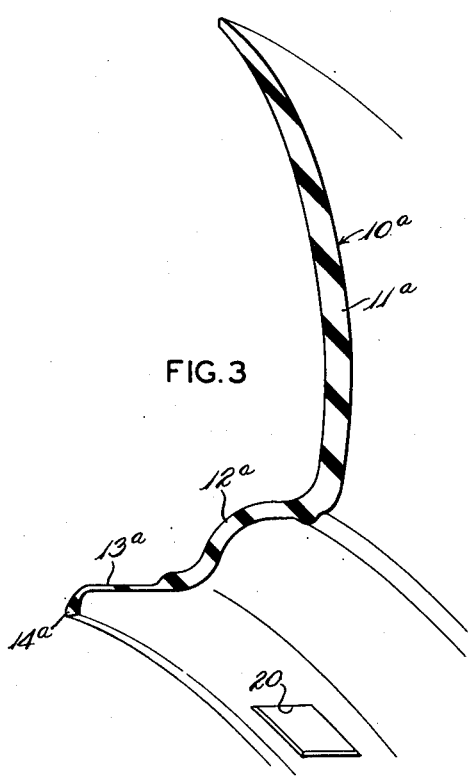
FIG. 3 is a vertical section of a modified type of a trim member shown in its molded contour, with a connecting portion of the trim member shown in perspective.

The novel and improved tire sidewall trim member 10 of the invention is made from any suitable material of any desired color, such as natural rubber, so-called synthetic rubbers, rubber-like materials, or other equivalent substances so that the trim member, which usually is molded to a desired contour, has an inherent resiliency and flexibility provided therein. Likewise, the trim member 10 has appreciable strength and inherent elasticity to maintain itself in effective operative engagement with the tire and wheel assembly 1. The trim member 10 includes a radially outer section 11 that is of relatively flatly curved contour and is of convex shape on its axially outer surface, as best shown in FIG. 3. A radially inner, or skirt section 12 is also provided on the trim member 10 and it is curved to extend generally axially and radially inwardly but to smoothly blend into and connect to the radially outer section 11.

Figure 2:
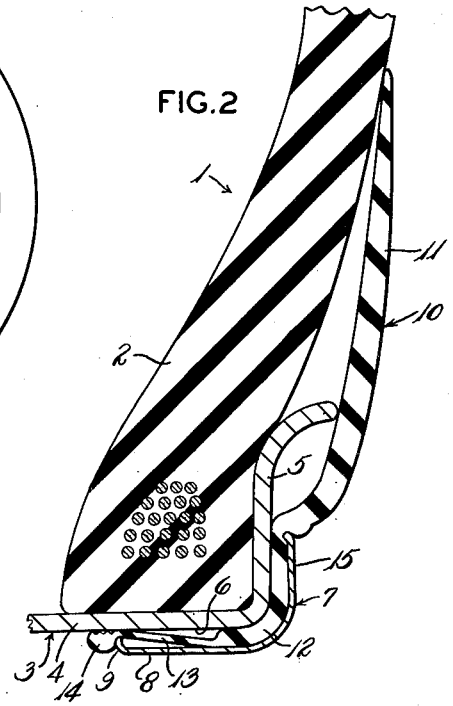
FIG. 2 is an enlarged vertical section taken on line 2—2 of FIG. 1 through a trim member and wheel assembly of the invention.

As an important feature of the invention, the trim member 10 in the radially inner, or skirt section 12 thereof terminates in a generally axially inwardly extending end portion or web 13. This end portion or web 13 is relatively thin in relation to the thickness of other portions of the skirt section 12, or the radially outer portion of the tire trim member 10. At its axially inner end, the web 13 has an enlarged, radially inwardly extending or turned bead or edge flange 14. FIG. 2 of the drawings clearly brings out the fact that the web 13 is of sufficient length at its uniformly thick, axially extending portion thereof as to extend axially inwardly of the tire and wheel assembly, as shown in FIG. 2, so that the bead or edge flange 14 is positioned axially inwardly of the tire and wheel assembly beyond the margins of the fingers 8, or equivalent retaining means formed on the wheel cover 7.

The wheel cover 7 may have a marginal flange 15 provided thereon that extends radially outwardly beyond the radially inner margins of the wheel 3 at the base 4 thereof to engage the radially outer portion of the skirt section 12 of the trim member to force it axially inwardly to at least substantially flatten such skirt portion against an associated outer wall or surface of the rim flange 5. The pressure applied to this part of the radially inner skirt section 12 of the trim member plus the general molded contour of the trim member forces the radially outer section 11 of the trim member axially inwardly towards the rim flange 5 and the side wall of the tire 2. Hence the radially outer section 11 of the trim member will usually be in resilient engagement with the laterally outer edge of the rim flange 5 although it may be axially spaced from such rim flange edge depending upon the particular initial molded contour of the trim member, the exact size relationship of the rim flange 5, the tire and other associated parts, including the wheel cover. Normally the radially outer section 11 of the trim member is partially flattened from its original molded contour, or else it is forced radially outwardly at its radially outer end when engaging a tire and wheel assembly to set up stresses in the trim member to aid in retaining the outer section 11 in resilient engagement with the tire under operative conditions and use. The trim member 10 will usually bridge over between portions of the rim flange 5 intermediate the lateral outer edge thereof and the base of the rim flange so that conventional wheel weights 16 can be secured to the wheel for wheel balance action.

As best shown in FIG. 2, the bead or edge flange 14 may be about twice the thickness of the adjacent portion of the web 13 and may extend both radially inwardly and outwardly therefrom.

Figure 4:
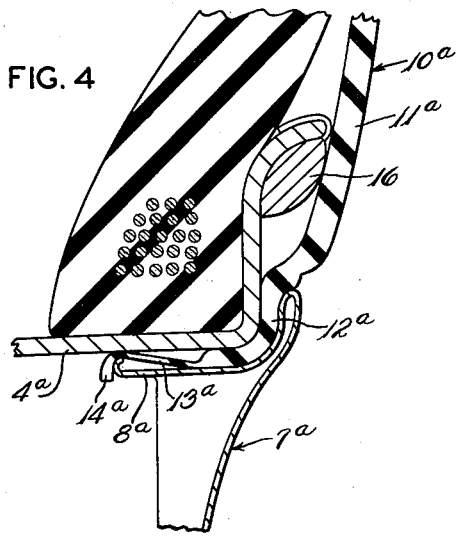
FIG. 4 is a fragmentary enlarged vertical section of the modified trim member of FIG. 3 in a wheel assembly, like FIG. 2.

Now referring to the structure of the modified tire trim member particularly shown in FIGS. 3 and 4, it is seen that this trim member has an appreciably thinner, cylindrically shaped web 13a provided thereon and extending axially inwardly of the remainder of the skirt portion 12a provided on this trim member. In this instance, the web portion may be, for example, only about one third to one quarter the thickness of the skirt portion of the trim member. Such skirt portion or section normally is about one half the maximum thickness of the remainder of the trim member, and the trim member may gradually taper in thickness to any desired thinness at its radially outer edge.

FIGS. 3 and 4 also particularly bring out the fact that in this instance, a bead or edge flange 14a, provided on the axially inner end of the web, is positioned radially inwardly therefrom. The bead or edge flange 14a may be of a maximum thickness of approximately two or three, or more times the thickness or radial dimension of the web 13 of the trim member so that an appreciably enlarged bead is formed that strengthens the radially and axially inwardly positioned portion of the trim member.

It will be particularly noted that in both trim members as used and provided in the invention, the beads or edge flanges 14 and 14a will normally be positioned completely axially within the margins of any retaining fingers, beads or flanges on the wheel cover. Naturally the webs 13 and 13a on the trim members are of sufficient thickness and are composed of a resilient material having very good abrasion, tear resistance, and modulus so that the claw action of the retaining fingers 8 of the wheel cover will not immediately or rapidly cut their way through the web of the tire trim member which will give it an effective service life. In fact, it has been shown that even though claws or other sharp members, formed on the wheel engaging parts of the wheel cover, may be brought into effective operative engagement with the trim member for several mountings and dismountings of the trim member on the tire and wheel assembly without any severe damage to the trim member. Even if the claws do cut through the web, the web is of such strength as to prevent or retard any additional tearing in the web, after an initial cut or blemish has been formed therein.

Of course, resilient flanges 8 and 8a on the wheel covers 7 and 7a will have their normal radially outwardly directed compressional force or engagement with the rim 4a of the wheel so that positioning the web portion of a trim member between such resilient flanges will provide even a more positive engagement between the wheel cover and the rim or wheel and with the engaging action of the wheel cover with the rim and also additionally serving to tightly bond or secure the trim member in position on the tire and wheel assembly.

As another feature of the trim member 10a of the invention, it may have a plurality of slots 20 provided therein when initially molded. Or these slotted areas may have an extremely thin section of rubber, or rubber-like material formed thereover as molded. These slots 20 are provided to engage with raised lugs or beads that are formed on circumferentially spaced portions of some tire wheels, and extend radially inwardly thereof. In some wheel assemblies, the resilient fingers, or means on the wheel cover are adapted to be engaged with or snapped over lugs formed on the radially inner surface of the tire seating rim portion formed on the wheel for wheel cover positioning action. Such lugs are provided at circumferentially spaced areas and 3 or 4 lugs, for example, each about an inch or an inch and a quarter long in a circumferential direction may be used. Thus, by forming the slots in the trim members, it is easy to position a trim member on the tire and wheel assembly with the slotted areas of the trim member extending over the lugs on the rim to prevent excessive frictional contact or spacing problems from arising in assembling the trim member with a wheel cover on a tire and wheel assembly.

It should be realized that the trim members or rings of the invention will engage in slightly different manners with different styles of wheel covers depending upon the specific construction of such wheel covers.

It will be noted that the trim members of the invention are in effect secured in position by at least two general forces, one radially outwardly directed against the radially inner portion of the trim member, whereas another force is axially inwardly directed against a spaced portion of the trim member to urge it against or towards a wall of the rim flange. By providing any type of locking beads or ribs on the radially and/or axially inner end portions of the trim members, these enlarged locking beads or ribs are difficult to move past the retaining flanges, fingers, or rings provided on the wheel covers. Hence, a very effective operative engagement with a wheel rim is secured for the trim members of the invention.

"Wheel cover" in this invention refers to a retaining member engaging the base, or inner surface of the tire rim portion of a wheel to be secured to the wheel by a generally axially inwardly extending section of the wheel cover, and to an annular ring retaining member used to secure the trim member to a wheel assembly.

In view of the foregoing, it is believed that a relatively sturdy, attractive trim member has been provided for tire sidewalls by the invention. Such trim member will provide a decorative or ornamental effect for a tire sidewall as the trim member can cover any desired radial length of the sidewall, but normally is maintained in operative engagement with the tire sidewall radially inwardly of the maximum width or shoulder portion of the tire. The trim member provides a very decorative assembly with associated tire and wheel means and provides an assembled effect for a tire as if it were of a smaller internal diameter than the actual diameter of the tire in the assembly. The trim member is secured in position by completely conventional means on the wheel cover and rim. Such members are associated with each other in accordance with conventional practices, but at the same time they will effectively bond or secure the trim member in operative engagement therewith. Thus it is believed that the objects of the invention have been achieved.

The present application is a continuation-in-part of my co-pending application Serial No. 796,899 filed March 3, 1959.

While two complete embodiments of the invention have been disclosed herein, it will be appreciated that modification of these particular embodiments of the invention may be resorted to without departing from the scope of the invention as defined in the appended claims.

What is claimed is:

1. In combination, a wheel having a tire seating rim and flange thereon, a pneumatic tire positioned on said rim, a wheel cover having a generally axially inwardly directed portion engaging said rim at the base of said flange to secure said wheel cover to said wheel, said wheel cover having a radially outer portion disposed axially outwardly of said wheel flange, and a resilient trim member having a radially outer section of flatly curved convex contour engaging the outer side wall portion of said tire and having a radially inner skirt section extending axially inwardly from said outer section, said trim member having a radially inner end section extending axially inwardly of said rim between said rim and said wheel engaging portion of said cover and terminating in an enlarged edge bead.

2. In combination, a wheel having a tire seating rim and flange thereon, a pneumatic tire positioned on said rim, a wheel cover having axially inwardly extending means thereon engaging said wheel rim to secure said wheel cover to said wheel, and a resilient trim member having a radially outer section of flatly curved convex contour engaging the outer side wall portion of said tire and having a radially inner skirt section extending generally radially and axially inwardly from said outer section, said trim member having a thin radially inner web extending axially inwardly of said rim and secured thereto by said means on said wheel cover, said trim member having an enlarged edge bead positioned axially within said rim beyond said wheel cover means to form a retaining ring to aid in preventing axial pull out of said trim member web from between said rim and wheel cover.

3. In combination, a wheel having a tire seating rim and flange thereon, a pneumatic tire positioned on said rim, a wheel cover having an axially inwardly directed portion engaging said rim at the base of said flange to secure said wheel cover to said wheel, said wheel cover having a radially outer flange disposed axially outwardly of said wheel flange, and a resilient trim member having a radially outer section of flatly curved convex contour engaging the outer sidewall portion of said tire and having a radially inner skirt section compressed between said wheel flange and said cover flange, said trim member having a radially inner web extending from the skirt section axially inwardly of the rim and compressed between said axially inwardly directed portion of said wheel cover and said rim, said web protruding axially inwardly beyond the axially inwardly directed portion of said wheel cover.

4. In combination with a wheel having a tire seating rim thereon, a tire on said rim, and a wheel cover; a resilient annular trim member having a radially outer section of generally flat convex outer contour engaging the tire sidewall and a radially inner section, said inner section including a generally cylindrical web and end portion extending inwardly of the wheel at the radially inner surface of the rim thereon, said web portion of said inner section being compressed against the wheel rim by parts of the wheel cover to position said radially outer section of said trim member resiliently against the sidewall of the tire, said end portion being enlarged relative to said web and being axially within and beyond all portions of the wheel cover in the tire and wheel assembly.

5. In combination, a wheel having a tire seating rim and flange thereon, a pneumatic tire positioned on said rim, a wheel cover having an axially inwardly directed portion engaging said rim adjacent the base of said flange to secure said wheel cover to said rim, and a resilient trim member having a radially outer section for positioning adjacent the sidewall portion of said tire and having a radially inner skirt section and a web section, said web section extending from the skirt section axially inwardly of the wheel and being compressed between part of said wheel cover and said rim, said web section extending axially inwardly of said rim beyond said wheel cover and being reinforced in such extended portion.

References Cited in the file of this patent

UNITED STATES PATENTS

| 2,244,014 | Lyon | June 3, 1941 |
| 2,963,325 | Aske et al. | Dec. 6, 1960 |
| 2,970,009 | Lyon | Jan. 31, 1961 |

FOREIGN PATENTS

| 1,061,278 | France | Nov. 25, 1953 |
| 209,315 | Australia | July 17, 1957 |